Dec. 2, 1941.  J. A. HIPPLE, JR  2,265,041

MAGNETIC FIELD GENERATOR

Filed Sept. 26, 1939

WITNESSES:
Leon M. Garman
David Kreider

INVENTOR
John A. Hipple, Jr.
BY
G. C. Saltzman
ATTORNEY

Patented Dec. 2, 1941

2,265,041

UNITED STATES PATENT OFFICE 2,265,041

MAGNETIC FIELD GENERATOR

John A. Hipple, Jr., Wilkinsburg, Pa., assignor to Westinghouse Electric & Manufacturing Company, East Pittsburgh, Pa., a corporation of Pennsylvania Application September 26, 1939, Serial No. 296,607

7 Claims. (Cl. 175—21)

My invention relates to a device for generating a magnetic field and it has particular relation to a device comprising a coil of spherical conformation, for producing a magnetic field uniform throughout a large volume.

Prior art methods of obtaining a uniform magnetic field over a relatively large region of space employ apparatus based on the principles of the Helmholtz coils, or utilize cylindrical solenoids long enough that the end effect produces no disturbing factors. Both of these methods, however, become very expensive and unwieldly when it is necessary to secure a very uniform and intense field.

It is, accordingly, an object of my invention to provide an improved coil arrangement which generates a uniform and intense magnetic field throughout a large volume.

Another object of my invention is to provide a spherical coil arrangement within which a uniform and intense magnetic field may be obtained.

More specifically stated, it is an object of my invention to provide a substantially spherical coil arrangement which will produce a uniform magnetic field throughout a large volume enclosed thereby regardless of the depth of winding, or the number of turns, required to obtain the desired field intensity.

From electromagnetic theory, it is known that a uniform field will be attained throughout the space enclosed by a spherical coil provided the number of ampere turns per unit length, along the axis of the windings, is constant. This relationship is discussed by Mascart and Joubert in "L'Electricité et le Magnetisme," vol. 1 (G. Masson, Ed., Paris 1882), pg. 546. In this case, however, the thickness of the windings must be kept very small, compared with the radius of the sphere, resulting in restricting the device to very low field strengths.

According to my invention, it is possible to construct a spherical coil which gives a uniform field regardless of the depths of the windings. To accomplish this, I construct the coil in such a manner that a number of thicknesses of windings, each answering the above requirement for a uniform field, may be conveniently employed in a single device to produce a field of high strength.

A field such as that produced by my invention is particularly useful in research apparatus, such as mass spectrographs.

Figure 1:
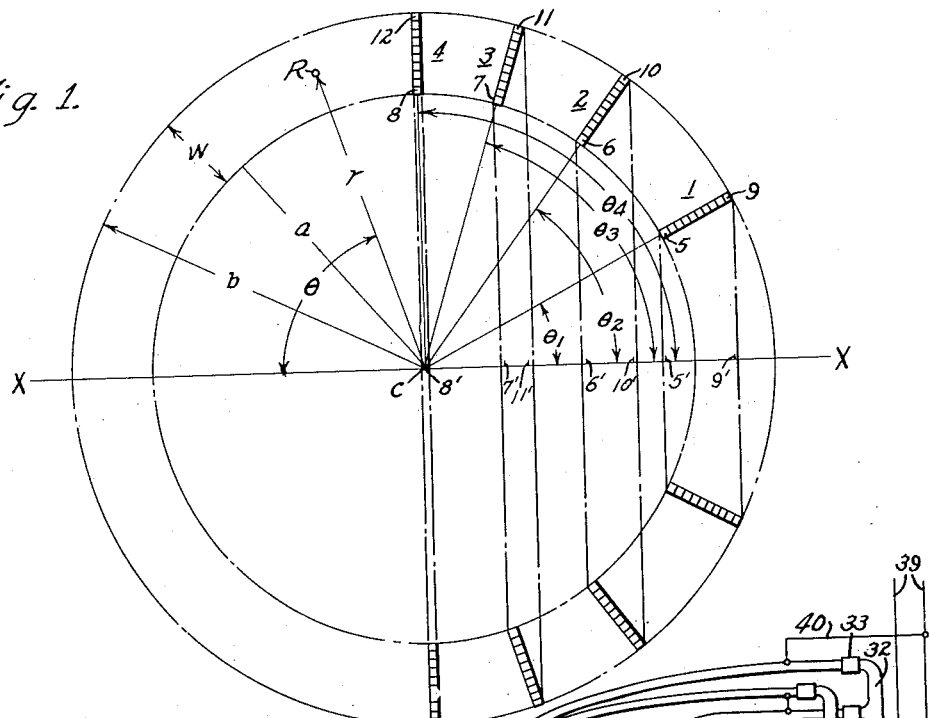
Figure 2:
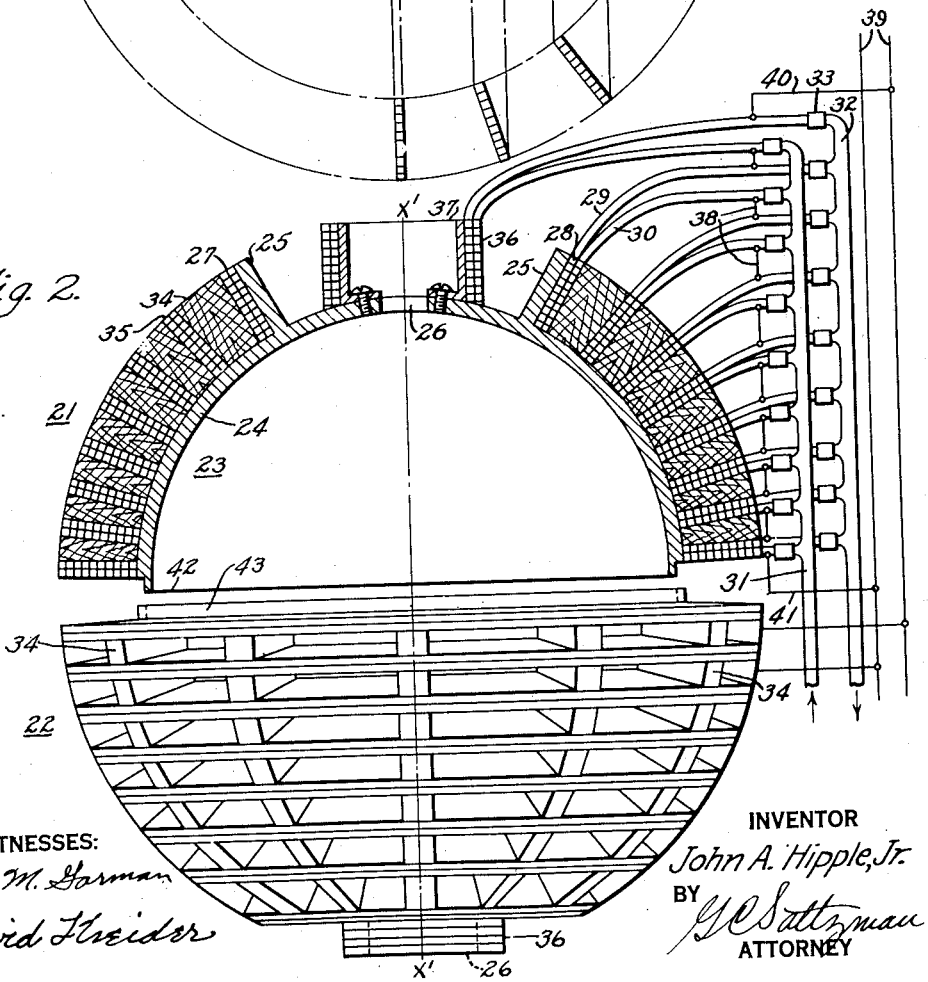

Other objects and advantages of my invention will become evident from the following description taken in conjunction with the accompanying drawing, in which:

Fig. 1 is a diagrammatic view of a section taken along the axis of a sphere for explanation of the operation of my invention; and Fig. 2 is an exploded elevation, partly in section, of a coil arrangement constructed in accordance with my invention.

Referring to Fig. 1, a space W between concentric spheres having radii $a$ and $b$, is provided for the coil windings. The vector $r$ represents the distance from the center of the spheres to any point R in the winding space, while $\theta$ represents the angle between the vector $r$ and the axis X—X of the coils. The direction of the resulting field is along the axis X—X.

Coils 1, 2, 3, and 4 in the form of hollow truncated cones with sides disposed along radii of the sphere at angles of $\theta_1$, $\theta_2$, $\theta_3$, and $\theta_4$ with the axis X—X, and each of which has the same electric current flowing therethrough, are located in the winding space W. The angles $\theta_1$, $\theta_2$, $\theta_3$, $\theta_4$ are so chosen that the innermost windings 5, 6, 7, and 8 of each coil which are located at approximately $r=a$ in magnitude produce projections 5', 6', 7', and 8', respectively, equally spaced along the axis X—X. Thus these windings produce a substantially uniform field within the sphere. Likewise the projections 9', 10', 11', and 12' of the outermost windings 9, 10, 11, and 12 upon the axis X—X are equally spaced and supply a uniform field. Obviously, all the turns of coils 1, 2, 3, and 4 located at any fixed radius between $a$ and $b$ will also furnish a uniform field and consequently the total field within the sphere of radius $a$ will be substantially uniform.

It is unnecessary to provide the same number of turns at each particular vector magnitude or radius since it is only required that all the coils at this same radial distance from the center $c$ be spaced from each other in such manner that the projections thereof along the axis X—X be evenly spaced. It will be evident that greater simplicity and ease of construction is attained with the arrangement illustrated in which case the current density in the various concentric spherical shells defined by the layers of windings varies inversely with the radius of the particular spherical shell.

From Fig. 1, it will be noted that the distance from the center $c$ to the projection along the axis X—X of any winding in the winding space W at the point $(r, \theta)$ may be measured in terms of the cosine of the angle $\theta$.

As shown in Fig. 2 a preferred form of my generator is made up of two substantially hemispherical sections 21 and 22. Since section 22 is substantially identical to section 21, only the latter which is shown principally in section, will be described. The section 21 comprises a winding form 23 preferably of brass and having the form of a hemisphere 24 intersected by a truncated portion 25 of a cone at a small angle such as approximately thirty degrees with the axis X'—X' of the hemisphere. The reason governing the selection of this angle will be set forth below. An aperture 26 may be provided in the winding form 23 around the axis X'—X' to permit access to the interior of the coil when the two sections 21 and 22 are in assembled relationship. It will be noted that the primed reference characters of Fig. 2 correspond to similar unprimed reference characters of Fig. 1.

Wound on the conical portion 25 of the form 23 is a winding unit or coil 27 comprising in this case, two layers of windings of insulated square conductor tubing 28, each layer extending through the depth of the winding space $w$ as indicated in Fig. 1. By providing two layers of windings in the coil 27 both ends 29 and 30 thereof may be located at the outside where they are readily accessible for making connection with the current supply and with other coils or winding units. A cooling fluid may be forced into one end of each coil 27 from a pipe 31 and allowed to drain from the other end thereof through another pipe 32. To insulate the coils from the pipe members 31 and 32, rubber couplings 33 may be provided as shown. If no fluid cooling means is required, the conductors 28 may be of solid square wire. Obviously square conductors are not required but they offer the advantages over the usual circular conductor that each coil unit presents a smooth conical surface for the succeeding windings.

A layer of tapered wooden wedges 34 is placed around the conical surface presented by the coil unit 27 and secured thereto in any suitable manner as by an adhesive or by means of cloth tape. These wedges 34 act as spacers for supporting the next coil 35 in its proper spaced relationship to coil 27. The coil 35 also is a section of a hollow cone with its apex at the center c' of the hemisphere and its axis or center line coinciding with X'—X'. The remaining coils are arranged in a similar manner over the hemispherical portion 24 up to the position where the angle with the axis X'—X' equals 90°, the size of the wedges between units decreasing in such manner as to give the desired spacing as explained in conjunction with Fig. 1.

Because of the small number of turns required in positions wherein $\theta$ is a small angle, as, for example, less than thirty degrees, a small cylindrical coil 36 carried by the brass form 37 may be applied in any suitable manner to the hemispherical portion of the form 23 at a position within the conical portion 25 to supply the ampere turns required there.

The various winding units of each winding section may be connected in series by means of conducting clips 38 and connected across the supply lines 39 through leads 40 and 41.

The two hemispherical sections 21 and 22 may be secured together in assembled position in any suitable manner. In cases where the winding axis X'—X' is vertical as shown in Fig. 2, the provision of an annular flange 42 on the section 21 proportioned to fit within an annular flange 43 on the section 22 will generally be satisfactory for this purpose.

Any suitable means, as, for example, supports extending through openings 26 or carried by the form 23 may be employed for securing the desired apparatus within the coil.

Although I have shown and described a specific embodiment of my invention, I am fully aware that many modifications thereof are possible. My invention, therefore, is not to be restricted except insofar as is necessitated by the prior art and the spirit of the appended claims.

I claim as my invention:

1. In a device for producing a uniform magnetic field, a sectional winding form presenting substantially the shape of a sphere in assembled condition, and a plurality of conducting coils upon said form, said coils each having substantially the same plural number of turns superimposed upon one another in the form of truncated portions of cones the surfaces of which coincide with radii of said sphere and the axes of which coincide with the same axis of said sphere, the spacing between coils varying in such manner that the cosines of the angles made by adjacent coils with said axis of said sphere differ by equal increments over a major portion of said form.

2. In a device for producing a uniform magnetic field, a coil structure presenting substantially the shape of a sphere comprising a pair of winding forms each comprising a substantially hemispherical portion and a portion in the form of a truncated cone with its apex at substantially the center of said sphere secured thereto, and a plurality of conducting coils upon each of said forms, said coils each having substantially the same number of turns and being in the shape of truncated portions of cones the surfaces of which lie along radii of said hemispherical portion and the center lines of which coincide with the center line of said conical portion of said winding form, the spacing between coils varying in such manner that the cosines of the angles made by adjacent coils with said center line differ by equal increments over a major portion of the said form.

3. In a device for producing a uniform magnetic field, a coil structure presenting substantially the shape of a sphere comprising a pair of winding forms each comprising a substantially hemispherical portion with a portion in the form of a truncated cone having its apex at substantially the center of said sphere secured thereto, at least one of said forms being provided with an opening for permitting access to the interior thereof when in assembled condition, and a plurality of conducting coils upon each of said forms, said coils each having substantially the same number of turns and being in the form of truncated portions of cones the surfaces of which lie along radii of said hemispherical portion and the center lines of which coincide with the center line of said conical portion of said winding form, the spacing between coils varying in such manner that the cosines of the angles made by adjacent coils with said center line differ by equal increments over a major portion of said form.

4. In a device for producing a uniform magnetic field, a coil structure presenting substantially the shape of a sphere comprising a pair of winding forms each comprising a substantially hemispherical portion with a portion in the form of a truncated cone having its apex at substantially the center of said sphere secured thereto, and a plurality of conducting coils upon each of said forms, said coils each having substantially the same number of turns and being in the form of truncated portions of cones the surfaces of which lie along radii of said hemispherical portion and the center lines of which coincide with the center line of said conical portion of said winding form, the spacing between coils varying in such manner that the cosines of the angles made by adjacent coils with said center line differ by equal increments, said winding units being applied to each of said forms over the space between the position at which the angle between the radii thereto and said center line equals approximately thirty degrees and the position at which it equals approximately ninety degrees.

5. In combination with the device as set forth in claim 4, a substantially cylindrical conducting coil applied to said winding form below said thirty degree angle position, the axis of said cylindrical coil coinciding with that of said other coils.

6. In a device for producing a uniform magnetic field, a substantially spherical winding form including at least one projection in the form of a truncated portion of an intersecting cone, a plurality of conducting coils each having substantially the same number of turns upon said form, said coils being in the shape of truncated portions of cones the surfaces of which lie along radii of said spherical form and the center lines of which coincide with a single axis of said spherical form, at least one of said coils being supported by said conical portion of said winding form, wedge means for spacing said coils, the spacing between said coils varying in such manner that the cosines of the angles made by adjacent coils with said axis of said spherical form differ by equal increments over the major portion of said form.

7. In a means for producing a uniform magnetic field throughout a substantially spherical volume, a plurality of conducting coils each disposed about the boundary of said volume concentrically around a predetermined axis thereof and comprising a plural number of turns superimposed upon one another in the form of a truncated portion of a cone the surface of which coincides with radii of said spherical volume and the axis of which coincides with said predetermined axis, said coils being spaced over a major portion of the length of said predetermined axis in such manner that the cosines of the angles which adjacent coils make therewith differ by equal amounts, and said coils having the same number of turns whereby the outer surfaces thereof are all at substantially equal radial distances from the center of said volume.

JOHN A. HIPPLE, Jr.